United States Patent
Youtz et al.

(10) Patent No.: US 11,337,119 B2
(45) Date of Patent: May 17, 2022

(54) NEXT GENERATION TO LONG TERM EVOLUTION (LTE) FALLBACK FOR VOICE CALLS

(71) Applicant: Verizon Patent and Licensing Inc., Arlington, VA (US)

(72) Inventors: Andrew E. Youtz, Rocky Hill, NJ (US); Hui Zhao, Marlboro, NJ (US); Lily Zhu, Parsippany, NJ (US); Deepa Jagannatha, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/534,733

(22) Filed: Aug. 7, 2019

(65) Prior Publication Data

US 2021/0045020 A1 Feb. 11, 2021

(51) Int. Cl.
*H04W 36/00* (2009.01)
*H04W 76/38* (2018.01)
*H04W 48/18* (2009.01)
*H04W 76/10* (2018.01)

(52) U.S. Cl.
CPC ... *H04W 36/0027* (2013.01); *H04W 36/0022* (2013.01); *H04W 48/18* (2013.01); *H04W 76/10* (2018.02); *H04W 76/38* (2018.02)

(58) Field of Classification Search
CPC .............................................. H04W 36/0027
See application file for complete search history.

(56) References Cited

U.S. PATENT DOCUMENTS

| | | | |
|---|---|---|---|
| 10,111,147 B1 | 10/2018 | Prasad et al. | |
| 10,952,270 B1* | 3/2021 | Sung | H04W 88/08 |
| 2014/0066061 A1* | 3/2014 | Lou | H04W 48/16 |
| | | | 455/434 |
| 2014/0293908 A1* | 10/2014 | Kumar | H04W 48/12 |
| | | | 370/329 |
| 2015/0358477 A1 | 12/2015 | Jeong et al. | |
| 2016/0095156 A1* | 3/2016 | Mitra | H04W 48/16 |
| | | | 370/329 |
| 2016/0278132 A1 | 9/2016 | Baek et al. | |
| 2016/0345149 A1* | 11/2016 | Chuttani | H04W 4/90 |
| 2017/0280422 A1* | 9/2017 | Prabhakar | H04W 72/0453 |
| 2017/0289860 A1* | 10/2017 | Wang | H04W 36/08 |
| 2017/0311151 A1 | 10/2017 | Ohashi et al. | |
| 2018/0084401 A1 | 3/2018 | Mbonye et al. | |
| 2018/0227960 A1 | 8/2018 | Belghoul et al. | |
| 2019/0069229 A1 | 2/2019 | Lee et al. | |

(Continued)

*Primary Examiner* — Edan Orgad
*Assistant Examiner* — Won Tae C Kim

(57) ABSTRACT

Systems and methods for Next Generation to Long Term Evolution (LTE) fallback are provided. An exemplary method includes detecting a request to set up a voice call originating from or terminating at a user equipment that is connected or configured to connect to a Next Generation mobile network; transitioning, in response to the request to set up the voice call, the user equipment from having a Next Generation mobile network connection with the Next Generation mobile network to having an LTE network connection with an LTE network, the detecting and the transitioning performed without call setup being performed for the voice call via the Next Generation mobile network; and performing call setup for the voice call via the LTE network connection with the LTE network.

20 Claims, 10 Drawing Sheets

(56) References Cited

U.S. PATENT DOCUMENTS

| | | |
|---|---|---|
| 2019/0069327 A1 | 2/2019 | Kim et al. |
| 2019/0098684 A1 | 3/2019 | Tamura |
| 2019/0159029 A1 | 5/2019 | Li et al. |
| 2019/0239271 A1 | 8/2019 | Guerzoni et al. |
| 2019/0268895 A1 | 8/2019 | Keller et al. |
| 2019/0313229 A1* | 10/2019 | Chiang .................. H04W 4/90 |
| 2019/0364412 A1* | 11/2019 | Huang-Fu ............... H04W 4/90 |
| 2020/0280836 A1* | 9/2020 | Velev ...................... H04W 8/12 |
| 2020/0413297 A1* | 12/2020 | Chiang ............. H04W 36/0022 |
| 2021/0136859 A1 | 5/2021 | Yoo et al. |

* cited by examiner

NEXT GENERATION TO LONG TERM EVOLUTION (LTE) FALLBACK FOR VOICE CALLS

BACKGROUND INFORMATION

Next Generation mobile networks have been proposed and are being adopted as the next evolution of mobile wireless networks such as the existing 4G and 4.5G Long Term Evolution (LTE) mobile networks. Next Generation mobile networks, such as Fifth Generation New Radio (5G NR) mobile networks, may operate in higher frequency ranges, and such networks may transmit and receive in the GigaHertz band with a broad bandwidth near 500-1,000 MegaHertz. The expected bandwidth of Next Generation mobile networks is intended to support download speeds of up to about 35-50 Gigabits per second. Next Generation mobile networks, such as those implementing the 5G mobile telecommunications standard, are expected to enable a higher utilization capacity than current wireless systems, permitting a greater density of wireless users, with a lower latency. Next Generation mobile networks, thus, are designed to increase data transfer rates, increase spectral efficiency, improve coverage, improve capacity, and reduce latency.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
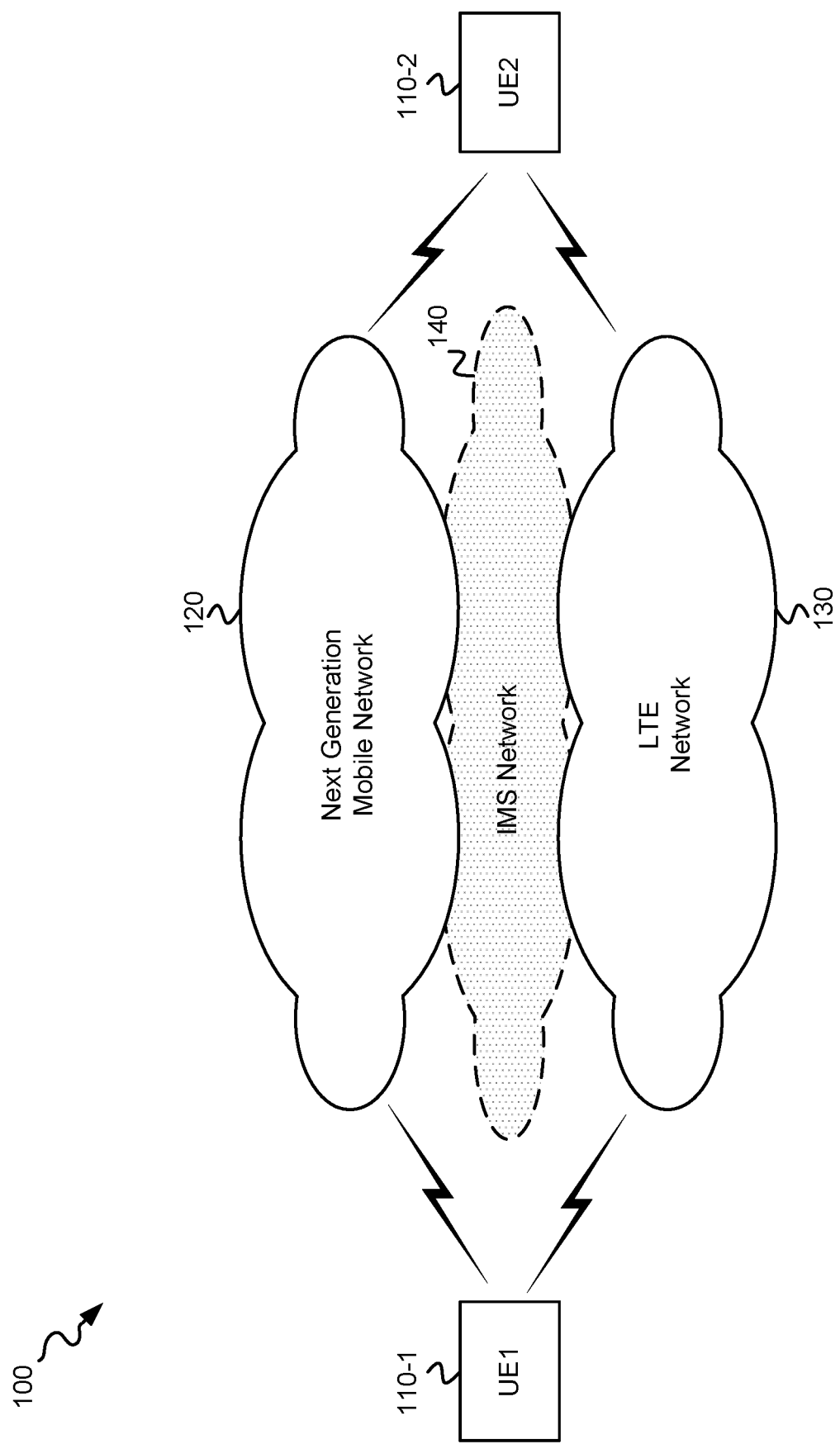
FIG. 1 depicts an exemplary network environment in which fallback from a Next Generation mobile network to an LTE network such as a Voice over LTE (VoLTE) network for voice calls may be provided according to principles described herein.

For initial Next Generation mobile network deployments, such as 5G NR deployments, support for voice calls over the Next Generation mobile networks may be unsupported or underdeveloped. One way to address this potential issue is to fallback from Next Generation mobile networks to LTE networks such as VoLTE networks for voice calls.

The way that such a fallback is implemented may affect device complexity, resource usage, voice call quality, and user experience. For example, a proposal specifies that a voice call be set up via a 5G NR network. Once the voice call is set up, e.g., via IMS signaling, initial voice packets flow over an IMS signaling or data bearer before a Quality Control Index (QCI) bearer (e.g., a QCI-1 bearer) associated with voice calls arrives. According to the proposal, the arrival of the QCI bearer triggers a fallback from the 5G NR network to a VoLTE network. The fallback is performed, and the voice call continues via the VoLTE network.

The time it takes to fallback from the 5G NR network to the VoLTE network may create a noticeable effect to participants in the voice call, such as a gap in the voice call during which audio data is not transmitted because fallback to the VoLTE network is being performed. To illustrate, a user of a Next Generation mobile device may place a voice call that is set up via the 5G NR network. Once voice call setup completes via the 5G NR network, the user may briefly talk and/or hear the call recipient talk via audio data transmitted via the 5G NR network (e.g., via an IMS signaling or data bearer). Fallback from the 5G NR network to a VoLTE network may then be triggered and performed, during which time audio data does not flow between the endpoints of the voice call, and the user may experience a gap in the audio for the voice call while the fallback is performed.

Instead of initiating a fallback from a Next Generation mobile network to an LTE network after voice call setup is performed via the Next Generation mobile network, systems and methods described herein may perform fallback from a Next Generation mobile network to an LTE network earlier in time, such as before or as part of call setup. Accordingly, the fallback may be performed without call setup being performed (e.g., without call setup being initiated or without call setup being completed) by way of the Next Generation mobile network. Such fallback may be implemented in any suitable way, including as a modification or a supplement to the current standard (e.g., by modifying or extending standard-based signaling).

By initiating a fallback from a Next Generation mobile network to an LTE network before and/or without call setup being performed via the Next Generation mobile network, as described herein, an audio gap during a voice call and/or any other effects caused by performing the fallback after call setup for the voice call may be prevented, and the time to set up the call may be shortened. This may be particularly important during an emergency call. In addition, call setup by way of the Next Generation mobile network may be avoided, which reduces the resources used for call setup.

Systems and methods described herein may also be configured to effectively handle "rainy-day" situations in which the Next Generation mobile network does not operate as expected, such as may occur when the Next Generation mobile network is congested, unresponsive, and/or delayed in responding. For example, systems and methods described herein may provide for autonomous fallback to LTE, which may allow for fallback to be timely performed even in situations in which the Next Generation mobile network is congested, unresponsive, and/or delayed in responding. In certain embodiments, for example, a watchdog timer is implemented and used to trigger autonomous fallback to LTE as described herein. In other embodiments, autonomous fallback is performed in response to a different trigger event (e.g., an initiation of a voice call) and includes falling back to LTE without notifying the Next Generation mobile network of the fallback and/or without relying on the Next Generation mobile network to initiate the fallback, as described herein.

Systems and methods described herein may provide additional or alternative features and benefits as may serve a particular implementation. Various embodiments will now be described with reference to the figures. The disclosed embodiments may provide one or more of the features and benefits mentioned above and/or various additional and/or alternative features and benefits that will be made apparent herein.

FIG. 1 depicts an exemplary network environment 100 in which a Next Generation network-connected user equipment (UE) may send and/or receive voice calls via a co-located LTE network such as a VoLTE network. As shown, network environment 100 includes a first UE 110-1 and a second UE 110-2 (generically referred to herein as "UE 110" or "UEs 110"), a Next Generation mobile network 120, an LTE network 130, and an IMS network 140.

UEs 110 may include any type of computing device that communicates via networks 120, 130, and 140. UEs 110 may each include, for example, a computer (e.g., a desktop, laptop, tablet, or wearable computer), a personal digital assistant (PDA), a "smart" phone, or a "Machine-to-Machine" (M2M) or "Internet of Things" (IoT) device. A "user" (not shown) may own, operate, administer, and/or carry each UE 110.

Next Generation mobile network 120 includes any type of a Next Generation mobile network that includes evolved network components (e.g., next generation components) relative to an LTE network such as a 4G or 4.5G mobile network. In one implementation, Next Generation mobile network 120 may include a 5G mobile network such as a 5G New Radio (NR) mobile network. LTE network 130 includes any type of a public land mobile network (PLMN) or satellite network that implements an LTE mobile telecommunications standard such as the 4G or 4.5G LTE standard, and which further implements the Voice over LTE Voice over Internet Protocol standard. IMS network 140 includes a network that uses Session Initiation Protocol (SIP) or other suitable IP-based protocol for voice and multimedia session control, such as for creating, modifying and terminating sessions between devices (e.g. UEs 110-1 and 110-2).

The configuration of network components of network environment 100 shown in FIG. 1 is for illustrative purposes. Other configurations may be implemented. Therefore, network environment 100 may include additional, fewer, and/or different components that may be configured in a different arrangement than that depicted in FIG. 1. For example, network environment 100 may include numerous UEs (e.g., UEs 110-1 through 110-x, where x>2).

Figure 2A:
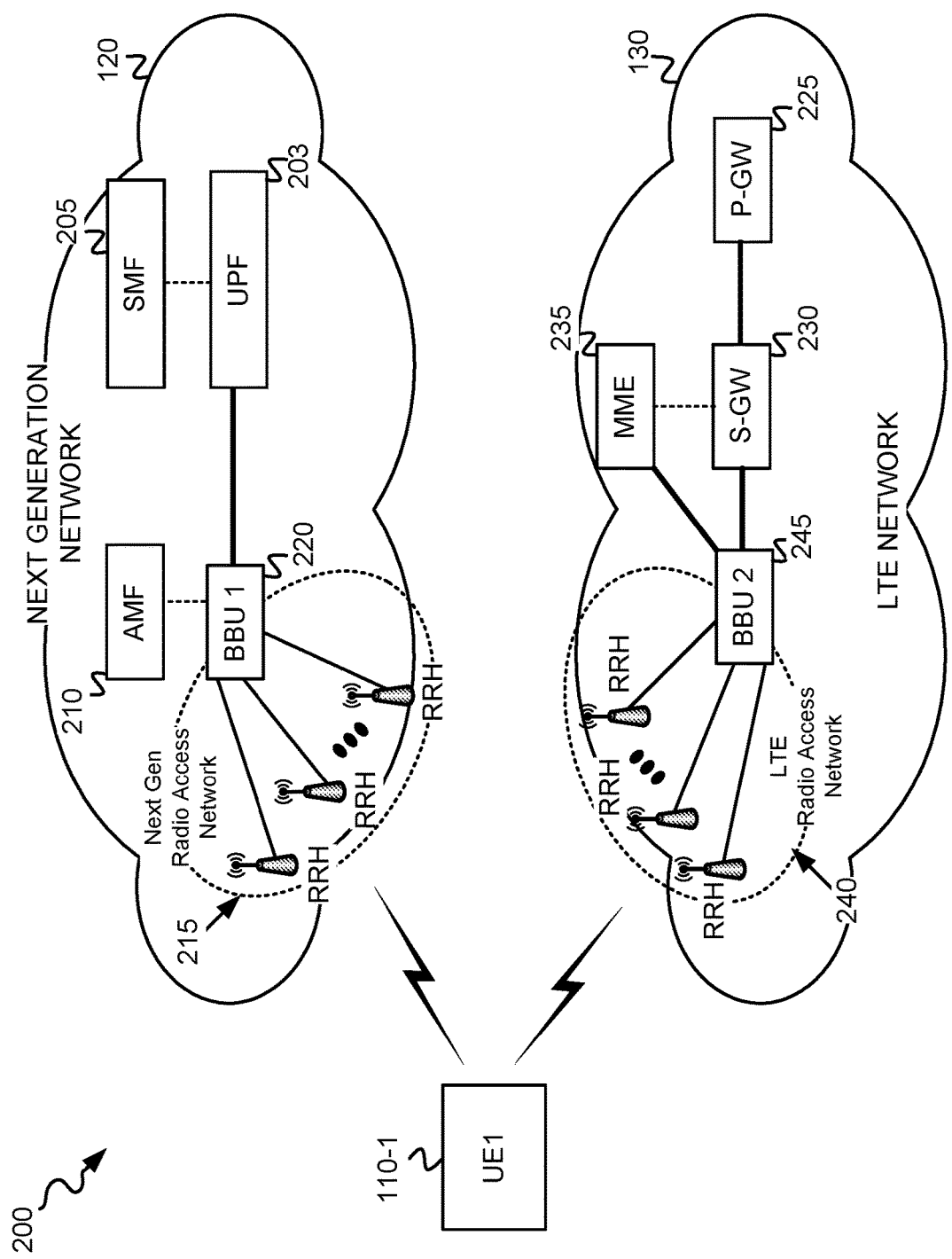
FIG. 2A depicts details of an exemplary portion of the network environment of FIG. 1 that includes the Next Generation mobile network and the LTE network according to principles described herein.

FIG. 2A depicts details of an exemplary portion 200 of network environment 100 of FIG. 1 that includes Next Generation mobile network 120 and LTE network 130. In the portion 200 shown in FIG. 2A, Next Generation mobile network 120 includes, among other nodes, a User Plane Function (UPF) node 203, a Session Management Function (SMF) node 205, an Access Management Function (AMF) node 210, and a Next Generation Radio Access Network (RAN) 215.

UPF node 203 includes a network device that acts as a router and a gateway between Next Generation mobile network 120 and an external packet data network (not shown), and forwards session data between the external packet data network and a base band unit in Next Generation mobile network 120. Next Generation mobile network 120 may include multiple UPF devices 203 disposed at various geographic locations in network 120. SMF node 205 includes a network device that performs session management, allocates network addresses to UEs 110, and selects and controls the UPF device 203 for data transfer. AMF node 210 includes a network device that performs UE-based authentication, authorization, and mobility management for UEs 110.

Next Generation Radio Access Network (RAN) 215 may include a first base band unit (BBU1) 220 and multiple remote radio heads (RRHs). Next Generation RAN 215 may also include one or more additional base band units (BBUs) and RRHs, and other wireless nodes and components, not shown in FIG. 2. BBU1 220 may connect to the multiple RRHs via, for example, optical fibers or other wired or wireless connections. BBU1 220 includes a network device that operates as a digital function unit that transmits digital baseband signals to the multiple RRHs and receives digital baseband signals from the multiple RRHs. If BBU1 220 is connected to the multiple RRHs via, for example, optical fibers, then BBU1 220 may convert the digital baseband signals into corresponding optical signals for transmission to the RRHs and may receive optical signals from the RRHs and convert the optical signals into corresponding digital baseband signals.

The RRHs include network devices that operate as radio function units that transmit and receive radio frequency (RF) signals to/from UEs 110. If the RRHs are connected to BBU1 220 via optical fibers, the RRHs may convert received RF signals to optical signals and transmit the optical signals to BBU1 220. Additionally, the RRHs may receive optical signals from BBU1 220 via the optic fibers and convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 110, and to transmit wireless RF signals to UE 110. If Next Generation mobile network 120 is a 5G NR network, BBU1 220 and an RRH represent a distributed Next Generation NodeB, which may also be referred to as a "gNB."

As further shown in the network portion 200 of FIG. 2A, LTE network 130 includes, among other nodes, a Packet Gateway node (P-GW) 225, a Serving Gateway node (S-GW) 230, a Mobility Management Entity node (MME) 235, and an LTE RAN 240.

Packet Gateway node (P-GW) 225 includes a network device that acts as a router and a gateway between LTE network 130 and the external packet data network (not shown), and forwards session data between the packet data network and a base band unit in LTE network 130. Serving Gateway node (S-GW) 230 includes a network device that routes and forwards session data between P-GW 225 and an LTE RAN 240 serving the session's destination UE 110.

Mobility Management Entity (MME) node 235 includes a network device that acts as a control entity for LTE network 130, including communicating with a HSS (not shown in FIG. 2) of LTE network 130 for user/device authentication and for user/device profile download. MME node 235 further provides UEs 110 with mobility management and session management functions using, for example, Network Access Stratum (NAS) signaling.

LTE RAN 240 may include a second base band unit (BBU2) 245 and multiple remote radio heads (RRHs). LTE RAN 240 may include one or more additional base band units (BBUs) and RRHs, and other wireless nodes and components, not shown in FIG. 2. BBU2 245 may connect to the multiple RRHs via, for example, optical fibers. BBU2 245 includes a network device that operates as a digital function unit that transmits digital baseband signals to the multiple RRHs and receives digital baseband signals from the multiple RRHs. If BBU2 245 is connected to the multiple RRHs via, for example, optical fibers, then BBU2 245 may convert the digital baseband signals into corresponding optical signals for transmission to the RRHs and may receive optical signals from the RRHs and convert the optical signals into corresponding digital baseband signals.

The RRHs include network devices that operate as radio function units that transmit and receive radio frequency (RF) signals to/from UEs 110. If the RRHs are connected to BBU2 245 via optical fibers, the RRHs may convert received RF signals to optical signals and transmit the optical signals to BBU2 245. Additionally, the RRHs may receive optical signals from BBU2 245 via the optic fibers and convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 110 and to transmit wireless RF signals to UE 110. If LTE network 130 is a 4G LTE network, BBU2 245 and an RRH represent a distributed evolved NodeB (eNB).

FIG. 2A illustrates a single exemplary implementation of the configuration of the components of Next Generation mobile network 120 and LTE network 130. Other components and configurations of Next Generation mobile network 120 and LTE network 130 may, however, be implemented. Therefore, Next Generation mobile network 120 and LTE network 130 may each include additional, fewer, and/or different components that may be configured differently than depicted in FIG. 2A and described herein. For example, though only a single base band unit BBU 1 220, and a single base band unit BBU 2 245, are shown as components of Next Generation RAN 215 and LTE RAN 240, respectively, each of Next Generation RAN 215 and LTE RAN 240 may include multiple base band units (i.e., >1 base band unit), with each of the multiple base band units further connecting to at least one RRH.

Figure 2B:
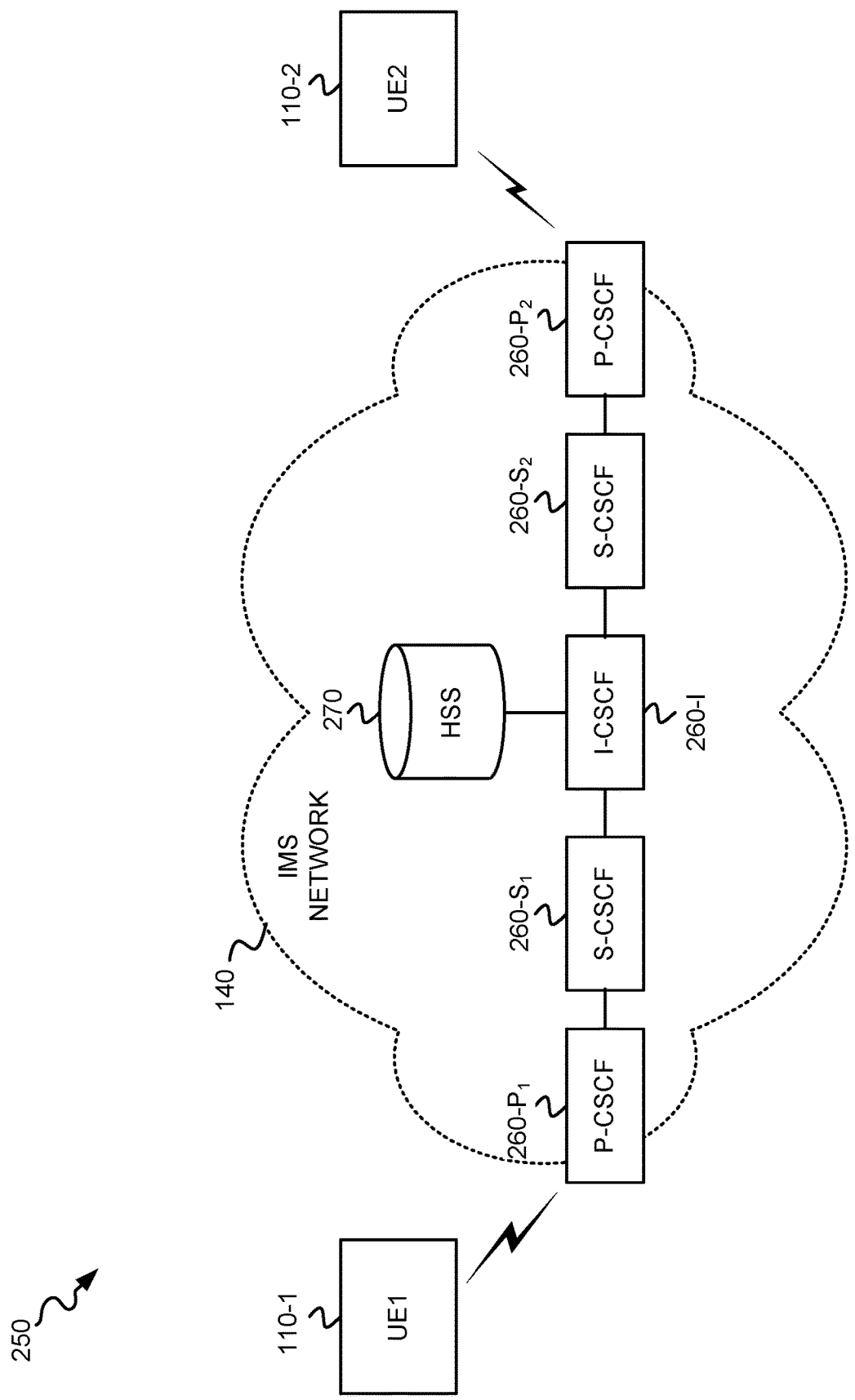
FIG. 2B depicts another portion of the network environment of FIG. 1 that includes components of an Internet Protocol Multimedia System (IMS) network according to principles described herein.

FIG. 2B depicts another portion 250 of the network environment 100 of FIG. 1, including components of IMS network 140. As shown, IMS network 140 may include a Proxy Call Session Control Function (P-CSCF) 260-P1, a serving Call Session Control Function (S-CSCF) 260-S1, an Interrogating Call Session Control Function I-CSCF 260-I, a S-CSCF 260-S2, a P-CSCF 260-P2, and a Home Subscriber Server (HSS) 270. P-CSCF 260-P1, S-CSCF 260-S1, I-CSCF 260-I, S-CSCF 260-S2, and P-CSCF 260-P2 may be generically and individually referred to herein as "CSCF 260".

P-CSCF 260-P1 acts as an edge of IMS network 140 through which UE 110-1 obtains access. P-CSCF 260-P1 maintains an awareness of all IMS endpoints that are currently registered with IMS network 140 and performs various manipulations of SIP signaling messages that are arriving from, or being sent to, the IMS endpoints (e.g., UEs 110-1 and 110-2). P-CSCF 260-P1 maintains a connection with S-CSCF 260-S1.

S-CSCF 260-S1 processes all originating and terminating SIP requests and responses associated with endpoints registered with S-CSCF 260-S1 (including UE 110-1). S-CSCF 260-S1 routes the SIP signaling towards its destination (e.g., towards P-CSCF 260-P1 and UE 110-1), or towards UE 110-2 via I-CSCF 260-I. I-CSCF 260-I passes SIP signaling to/from S-CSCF 260-S1 and S-CSCF 260-S2. I-CSCF 260-I queries HSS 270 to learn the identity of the S-CSCF assigned to a given UE 110 so that it can properly forward the SIP signaling. HSS 270 includes a master user database (DB) that supports all of CSCFs 260 of IMS network 140. The master user DB of HSS 270 stores user subscription-related information (e.g., subscriber profiles), and performs authentication and authorization of the user. The subscriber profiles stored in the DB of HS 270 may include an indication of whether a given user has subscribed to usage of LTE network 130 and/or Next Generation Mobile Network 120.

S-CSCF 260-S2 processes all originating and terminating SIP requests and responses associated with endpoints registered with S-CSCF 260-S2 (including UE 110-2). S-CSCF 260-S2 routes the SIP signaling towards its destination (e.g., towards P-CSCF 260-P2 and UE 110-2), or towards UE 110-1 via I-CSCF 2610-I. P-CSCF 260-P2 acts as an edge of IMS network 140 through which UE 110-2 obtains access. P-CSCF 260-P2 maintains an awareness of all IMS endpoints that are currently registered with IMS network 140 and performs various manipulations of SIP signaling messages that are arriving from, or being sent to, the IMS endpoints (e.g., UEs 110-1 and 110-2). P-CSCF 260-P2 maintains a connection with S-CSCF 260-S2. S-CSCF 260-S1 and S-CSCF 260-S2 may obtain subscriber profile information from HSS 270 to determine whether UE 110-1 and/or UE 110-2 are subscribed for usage of LTE network 130 and/or Next Generation Mobile Network 120.

P-CSCF 260-P1, S-CSCF 260-S1, I-CSCF 260-I, S-CSCF 260-S2, and/or P-CSCF 260-P2 may each include functionality implemented in multiple, different network devices, or in a same, single network device.

The configuration of network components of portion 250, of the network environment 100 of FIG. 1, shown in FIG. 2B is for illustrative purposes. Other configurations may be implemented. Therefore, portion 250 may include additional, fewer, and/or different components that may be configured in a different arrangement than that depicted in FIG. 2B.

Figure 3:
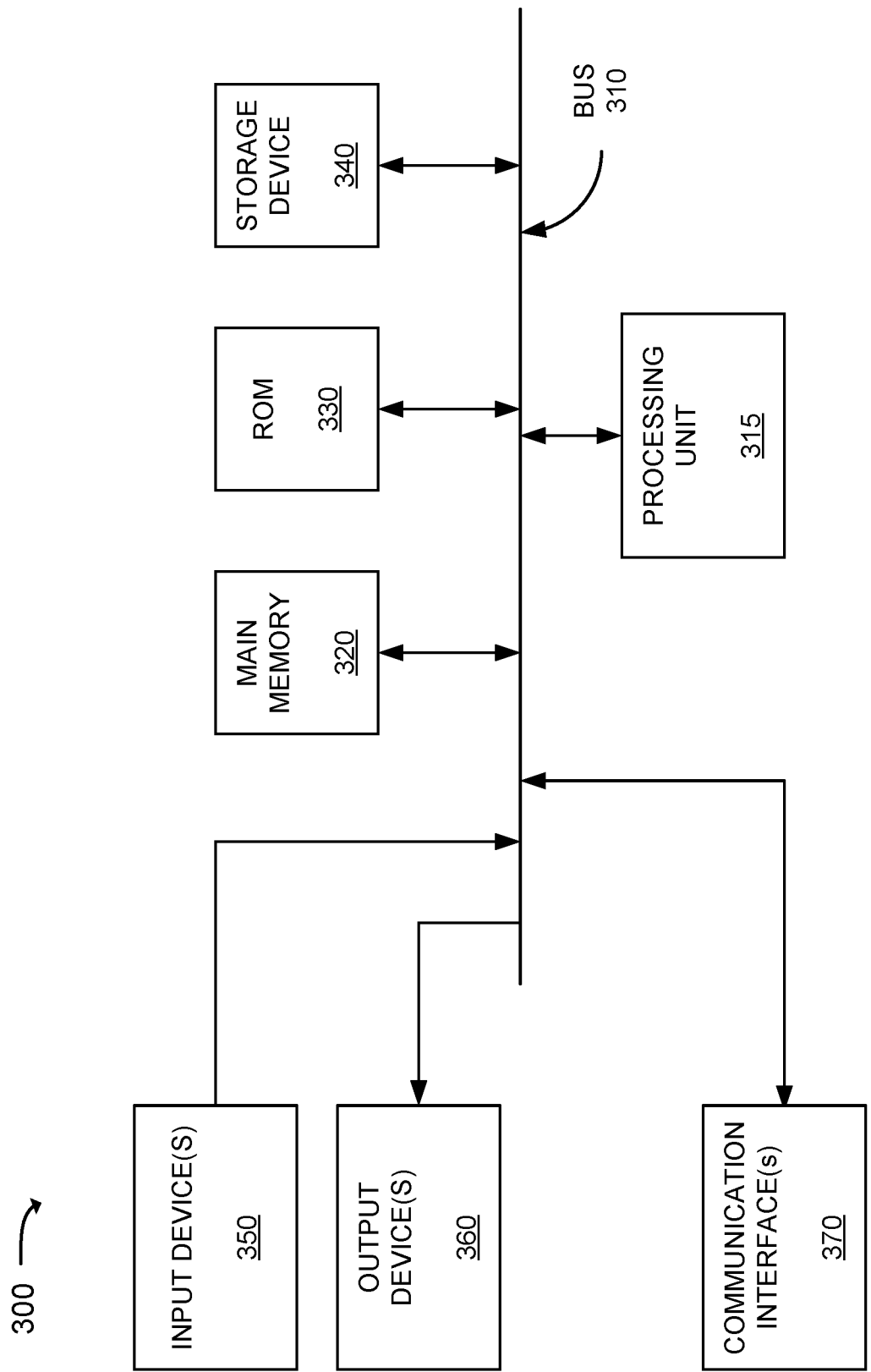
FIG. 3 depicts exemplary components of a network device that may correspond to various devices/nodes of the network environment of FIG. 1 according to principles described herein.

FIG. 3 is a diagram of exemplary components of a network device 300. Network device 300 may correspond to UE 110, UPF node 200, SMF node 205, AMF node 210, BBU 1 220, BBU 2 245, P-GW node 225, S-GW node 230, HSS 270, P-CSCF 260-P, S-CSCF 260-S, I-CSCF 260-I, and/or MME node 235. Network device 300 may include a bus 310, a processing unit 315, a main memory 320, a read only memory (ROM) 330, a storage device 340, an input device 350, an output device 360, and a communication interface(s) 370. Bus 310 may include a path that permits communication among the elements of network device 300.

Processing unit 315 may include one or more processors or microprocessors which may interpret and execute stored instructions associated with one or more processes, or processing logic that implements the one or more processes. For example, processing unit 315 may include, but is not limited to, programmable logic such as Field Programmable Gate Arrays (FPGAs) or accelerators. Processing unit 315 may include software, hardware, or a combination of software and hardware for executing the processes described herein.

Main memory 320 may include a random-access memory (RAM) or another type of dynamic storage device that may store information and, in some implementations, instructions for execution by processing unit 315. ROM 330 may include a Read Only Memory (ROM) device or another type of static storage device (e.g., Electrically Erasable Programmable ROM (EEPROM)) that may store static information and, in some implementations, instructions for use by processing unit 315. Storage device 340 may include a magnetic and/or optical recording medium and its corresponding drive. Main memory 320, ROM 330 and storage device 340 may each be referred to herein as a "non-transitory computer-readable medium" or a "non-transitory storage medium."

Input device 350 may include one or more devices that permit a user or operator to input information to network device 300, such as, for example, a keypad or a keyboard, a display with a touch sensitive panel, voice recognition and/or biometric mechanisms, etc. Output device 360 may include one or more devices that output information to the operator or user, including a display, a speaker, etc. Input device 350 and output device 360 may, in some implementations, be implemented as a graphical user interface (GUI) that displays GUI information and that receives user input via the GUI. In some implementations, such as when network device 300 is a UPF node 200, SMF node 205, AMF node 210, P-GW node 225, S-GW node 230, or MME node 235, input device 350 and/or output device 360 may be omitted from network device 300.

Communication interface(s) 370 may include one or more transceivers that enable network device 300 to communicate with other devices and/or systems. For example, in the case where network device 300 is a UE 110, communication interface(s) 370 may include a wireless transceiver (including at least one antenna) for communicating with one or more RRHs of Next Generation RAN 215 and/or LTE RAN 240. In some implementations, communication interface(s) 370 may include a Global Positioning System (GPS) device that can determine the geographic location of network device 300 (e.g., a current geographic location of a UE 110). In the cases of UPF node 200, SMF node 205, AMF node 210, P-GW node 225, S-GW node 230, MME node 235, BBU 1 220 and BBU 2 245, communication interface(s) 370 may include at least one wired transceiver for wired communication via Next Generation mobile network 120 and/or LTE network 130. In some implementations, communication interface(s) 370 of BBU 1 220 and BBU 2 245 may include one or more optical transceivers for communicating with RRHs via optical fiber.

Network device 300 may perform certain operations, including one or more of the exemplary operations described herein. Network device 300 may perform these operations in response to processing unit 315 executing software instructions contained in a computer-readable medium, such as memory 320. A computer-readable medium may be defined as a physical or logical memory device. A logical memory device may include memory space within a single physical memory device or spread across multiple physical memory devices. The software instructions may be read into main memory 320 from another computer-readable medium, such as storage device 340, or from another device via communication interface(s) 370. The software instructions contained in main memory 320 may cause processing unit 315 to perform the operations or processes, as described herein.

Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of network device 300 illustrated in FIG. 3 is for illustrative purposes only. Other configurations may be implemented. Therefore, network device 300 may include additional, fewer, and/or different components, arranged in a different configuration, than depicted in FIG. 3.

Certain exemplary processes for falling back from a Next Generation mobile network such as Next Generation mobile network 120 to an LTE network such as LTE network 130 for voice calls will now be described. The processes may be implemented and/or performed by one or more suitably configured network devices and may facilitate falling back from a Next Generation mobile network to an LTE network for a voice call without call setup for the voice call being performed via the Next Generation mobile network. As used herein, voice call setup via the Next Generation mobile network may include any signaling (e.g., SIP signaling via an IMS core network) and/or operations performed by user equipment and/or one or more nodes of the Next Generation mobile network to set up, via the Next Generation mobile network (e.g., via a connection between a user equipment and the Next Generation mobile network), a bearer for the voice call (e.g., an IMS signaling or data bearer, a dedicated radio bearer (DRB), and/or a dedicated QCI 1 bearer for data packets for the voice call). Accordingly, not performing voice call setup via a Next Generation mobile network may include not completing, not initiating, or not performing any call setup signaling or operations for the voice call (e.g., not performing call setup specific to the voice call) via the Next Generation mobile network. In certain examples, not performing voice call setup via the Next Generation mobile network may include not establishing a dedicated bearer for the voice call via the Next Generation mobile network (e.g., via a connection to the Next Generation mobile network). In certain examples, not performing voice call setup via the Next Generation mobile network may include user equipment not engaging in call setup for the voice call via the Next Generation mobile network.

Figure 4:
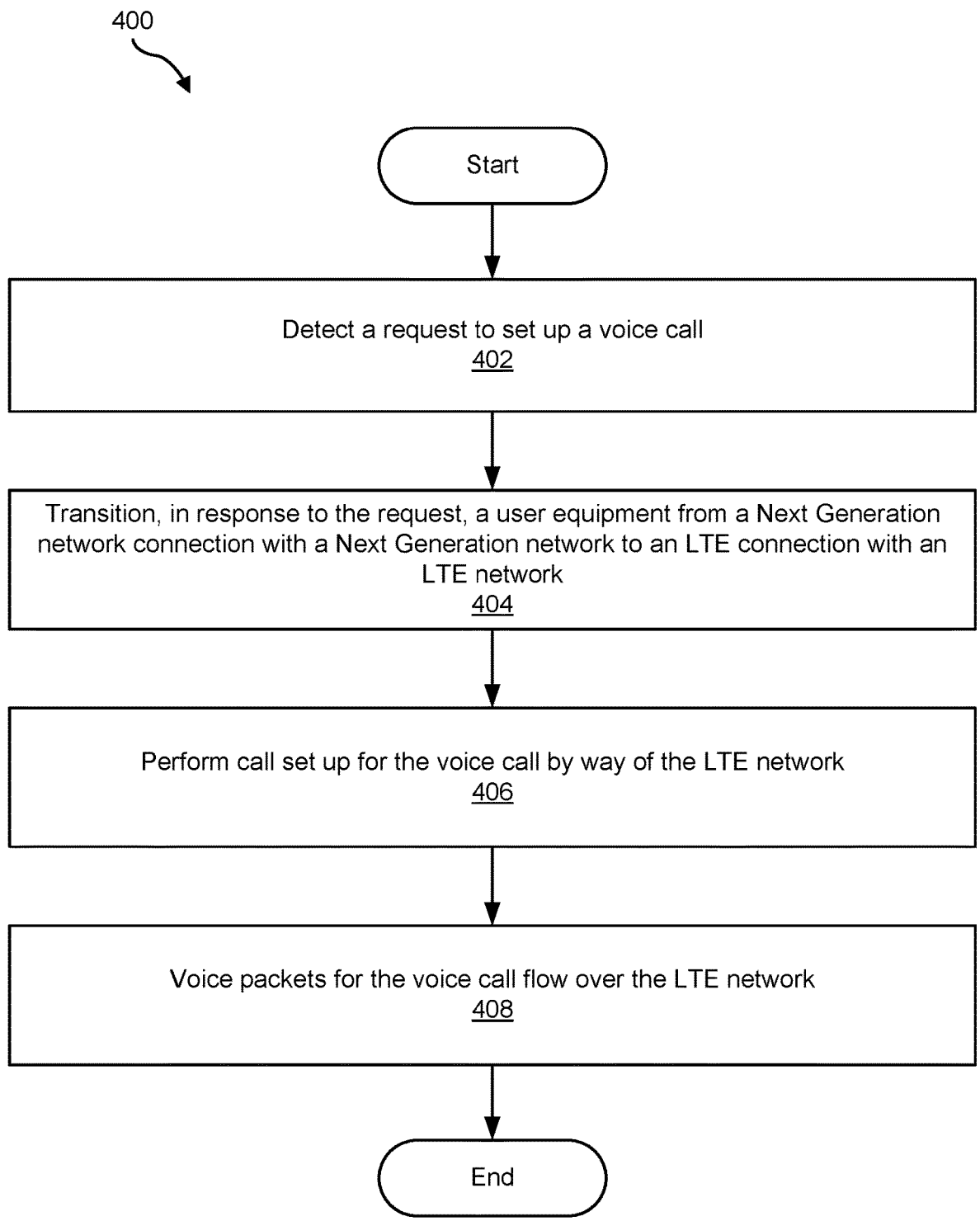
FIG. 4 depicts an exemplary method of falling back to an LTE network for a voice call according to principles described herein.

FIG. 4 illustrates an exemplary method 400 of falling back to an LTE network for a voice call. While FIG. 4 illustrates exemplary operations according to certain embodiments, other embodiments may omit, add to, reorder, and/or modify any of the operations shown in FIG. 4. One or more of the operations shown in FIG. 4 may be implemented and/or performed by one or more network devices such as user equipment 110 and/or one or more nodes of Next Generation mobile network 120, LTE network 130, and/or IMS network 140.

Method 400 includes detecting a request to set up a voice call (block 402). The request to set up a voice call may be detected in any suitable way. As an example of detecting a request to set up a voice call, user equipment 110 may detect an initiation of a voice call. The initiation of the voice call may be an initiation of an outgoing voice call by a user of user equipment 110 or an invitation (e.g., a SIP INVITE) received by user equipment 110 to accept an incoming voice call. As another example of detecting a request to set up a voice call, a node in Next Generation mobile network 120 may receive, from user equipment 110 by way of a Next Generation mobile network connection between user equipment 110 and the node, a service request for voice service fallback to LTE network 130. Examples of such a service request are described in detail herein.

The request to set up the voice call is detected without call setup for the voice call being performed in Next Generation mobile network 120. For example, user equipment 110 may detect an initiation of the voice call and/or the service request may be received by the Next Generation node without any call setup for the voice call being performed in Next Generation mobile network 120.

Method 400 further includes transitioning, in response to the request to set up the voice call, user equipment from having a Next Generation network connection with the Next Generation network to having an LTE connection with an LTE network (block 404). The transitioning is performed without call setup for the voice call being performed in the Next Generation mobile network. For example, the transitioning may be performed without a dedicated bearer for the voice call being set up via the Next Generation mobile network 120 (e.g., via a connection between the user equipment 110 and the Next Generation mobile network 120). Accordingly, no audio data for the voice call is sent or received by way of the Next Generation mobile network 120.

The transitioning may be performed in way suitable to support transitioning the user equipment from having a Next Generation network connection with a Next Generation network to having an LTE connection with an LTE network without call setup specific to the voice call being performed in the Next Generation mobile network. Examples of such transitioning are described in more detail herein.

Method 400 further includes performing call setup for the voice call via the LTE network (block 406). Call setup for the voice call may be performed by way of the LTE network in any suitable way after the transition to the LTE network is performed. In certain examples, the call setup for the voice call may include user equipment 110 and one or more nodes of LTE network 130 and/or IMS network 140 performing signaling (e.g., RRC signaling, NAS signaling by way of the LTE connection, and SIP signaling by way of IMS network 140) and/or other operations to establish a dedicated bearer for the voice call. The dedicated bearer may be built on the LTE connection between user equipment 110 and LTE network 130.

After a bearer for the voice call is set up, method 400 further includes voice data packets for the voice call flowing over the LTE network (block 408). This may include the voice data packets flowing over the LTE connection between user equipment 110 and LTE network 130, such as voice data packets flowing over a packet data network (PDN) connection built on the LTE connection.

In certain implementations, the call setup for the voice call (block 406) and the flow of voice data packets for the voice call (block 408) may be performed using and/or based on known VoLTE technologies, including existing VoLTE standards. For example, NAS signaling via the LTE connection and SIP signaling via the IMS network 140 may be performed to set up the voice call to establish a session and a data bearer for the voice call on top of LTE network 130.

Specific examples of falling back to LTE for a voice call will now be described. The specific examples illustrate various exemplary ways that operations of method 400 may be performed, including various ways that user equipment may be transitioned from having a Next Generation network connection with a Next Generation network to having an LTE connection with an LTE network, without call setup for the voice call being performed by way of the Next Generation mobile network.

Figure 5:
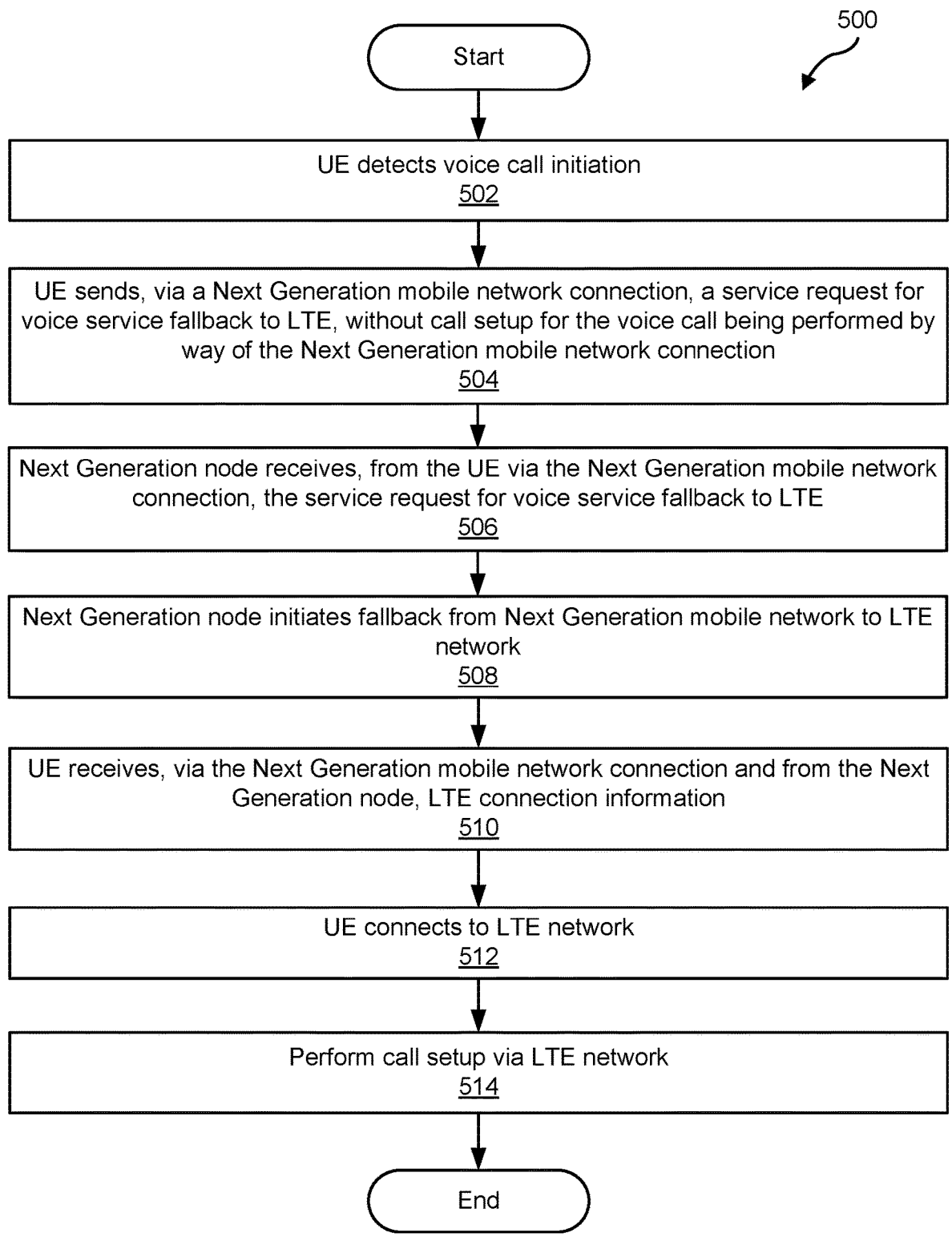
FIG. 5 depicts an exemplary method of falling back to an LTE network for a voice call according to principles described herein.

FIG. 5 illustrates an exemplary method 500 of falling back to an LTE network for a voice call. While FIG. 5 illustrates exemplary operations according to certain embodiments, other embodiments may omit, add to, reorder, and/or modify any of the operations shown in FIG. 5. One or more of the operations shown in FIG. 5 may be implemented and/or performed by network devices such as user equipment 110 and one or more nodes in Next Generation mobile network 120, LTE network 130, and/or IMS network 140.

Method 500 includes user equipment (UE) 110 detecting initiation of a voice call (block 502). User equipment 110 may detect the initiation of the voice call in any suitable way, including by detecting an initiation of an outgoing voice call by a user of user equipment 110 or by receiving an invitation to join an incoming voice call.

Method 500 further includes user equipment 110 sending, via a Next Generation mobile network connection to Next Generation mobile network 120, a service request for voice service fallback to LTE (block 504). User equipment 110 sends the service request without call setup for the voice call being performed by way of the Next Generation mobile network connection.

The Next Generation mobile network connection may include any suitable communicative connection between user equipment 110 and a node of Next Generation mobile network 120. For example, the connection may include a Next Generation Radio Resource Control (RRC) connection (e.g., a 5G NR RRC connection) between user equipment 110 and a node of Next Generation mobile network 120.

If user equipment 110 is idle when initiation of the voice call is detected (e.g., no RRC connection is established with Next Generation mobile network 120), user equipment 110 may set up, as part of block 504, the Next Generation mobile network connection in response to the detection and before sending the service request via the connection.

User equipment 110 may detect the initiation of the voice call (block 502) and send the service request for voice service fallback to LTE (block 504) without engaging in call setup for the voice call via Next Generation mobile network 120. This may include user equipment 110 not engaging in LTE call setup and/or IMS call setup via Next Generation mobile network 120.

Method 500 further includes a node of Next Generation mobile network 120 receiving the service request for voice service fallback to LTE from user equipment 110 via the Next Generation mobile network connection (block 506). The node may include any suitable node of Next Generation mobile network 120. For example, the node may include an RRH, BBU 1 220, and/or AMF 210 of Next Generation mobile network 120.

The service request for voice service fallback to LTE, as sent by user equipment 110 and received by a node of Next Generation mobile network 120, may be in any suitable format (e.g., data format, transport format, protocol format, etc.) and may include any data suitable for requesting fallback from Next Generation mobile network 120 to LTE network 130 for the voice call. As an example, the service request may include a service request message defined in accordance with a Next Generation standard such as the 5G NR standard and modified to include an information element (IE) that indicates the request for voice service fallback to LTE. As another example, the service request may include a Next Generation extended service request message such as a 5G NR extended service request message, which may be an extension to the 5G NR standard.

Method 500 further includes the node of Next Generation mobile network 120 initiating, in response to the service request for voice service fallback to LTE, fallback from Next Generation mobile network 120 to LTE network 130 (block 508). The node may perform any suitable operations and/or signaling to initiate the fallback, including communicating with user equipment 110 and/or one or more nodes of Next Generation mobile network 120 and/or LTE network 130 to initiate the fallback. The fallback may be performed in any suitable way and using any known fallback technologies, including handover (e.g., inter-radio handover) technologies, redirection technologies, and/or any other network transition technologies. Accordingly, the fallback may be performed via a handover, a redirection, or any other suitable transition from Next Generation mobile network 120 to LTE network 130.

As part of initiating the fallback, the Next Generation node may provide LTE connection information to user equipment 110 and release the Next Generation mobile network connection between user equipment 110 and Next Generation mobile network 120. The LTE connection information may include any information related to connecting to LTE network 130 (or other LTE network in other examples) to enable user equipment 110 to engage in connection setup and call setup via LTE network 130.

Method 500 further includes user equipment 110 receiving the LTE connection information via the Next Generation mobile network connection and from the Next Generation node (block 510). User equipment 110 may use the information in any suitable way to transition from having a connection to Next Generation mobile network 120 to having a connection with LTE network 130.

Accordingly, user equipment 110 may connect to the LTE network (block 512). User equipment 110 may perform any suitable operations and signaling, in conjunction with one or more nodes of the LTE network, to establish an LTE connection with the LTE network. Such operations and signaling may include known LTE connection operations and signaling. For example, user equipment 110 may acquire an LTE signal (based on received LTE connection information), establish an LTE connection, and send a Tracking Area Update (TAU) request to LTE network 130 by way of the LTE connection. In addition, user equipment 110 may re-register with IMS network 140 and request a PDN connection. The connection to the LTE network may be established in any suitable way, such as by way of a handover in which an RRC connection with user equipment 110 stays active but is moved from the Next Generation mobile network to the LTE network, by way of a redirection in which the Next Generation mobile network releases the Next Generation RRC connection with user equipment 110 and an LTE RRC connection is established with user equipment 110, or by way of any other suitable way of establishing the LTE connection.

The LTE connection may include any suitable communicative connection between user equipment 110 and a node of LTE network 130. For example, the connection may include an LTE RRC connection between user equipment 110 and a node of LTE network 130, a PDN connection built on the LTE RRC connection, an IMS-based connection, and/or any other suitable LTE-based connection (e.g., one or more signaling and/or bearer connections) by way of which user equipment 110 may communicate with one or more nodes of LTE network 130 and/or IMS network 140.

Method 500 further includes performing call setup for the voice call via the LTE network (block 514). Call setup for the voice call may be performed by way of the LTE network in any suitable way after the LTE connection between user equipment 110 and the LTE network is established in block 512. In certain examples, the call setup for the voice call may include user equipment 110 and one or more nodes of LTE network 130 and/or IMS network 140 performing signaling (e.g., RRC signaling, NAS signaling by way of the LTE connection, and SIP signaling by way of IMS network 140) and/or other operations to establish a dedicated bearer for the voice call. The dedicated bearer may be built on the LTE connection between user equipment 110 and LTE network 130.

After a bearer for the voice call is set up, voice data packets for the voice call may flow over the LTE network. This may include the voice data packets flowing over the LTE connection between user equipment 110 and LTE network 130, such as voice data packets flowing over a packet data network (PDN) connection built on the LTE connection.

In certain implementations, the call setup for the voice call and the flow of voice data packets for the voice call may be performed using and/or based on known VoLTE technologies, including existing VoLTE standards. For example, NAS signaling via the LTE connection and SIP signaling via the IMS network 140 may be performed to set up the voice call to establish a session and a data bearer for the voice call on top of LTE network 130.

Method 500 applies to outgoing (originating) and incoming (terminating) voice calls. For a voice call originating from user equipment 110, user equipment 110 detects an initiation of the voice call at user equipment 110, and in response sends a service request for voice service fallback to LTE to Next Generation mobile network 120 via a connection to Next Generation mobile network 120. If user equipment 110 is idle in this situation, user equipment 110 may set up a connection to Next Generation mobile network 120 and then send the service request via the connection. For a voice call terminating at user equipment 110, user equipment 110 detects receipt of an invitation to join the incoming voice call and in response sends a service request for voice service fallback to LTE to Next Generation mobile network 120. If user equipment 110 is idle in this situation, user equipment 110 may receive a page from Next Generation mobile network 120 and respond by setting up a connection to Next Generation mobile network 120 over which the invitation (e.g., a SIP INVITE) is then received.

Figure 6A:
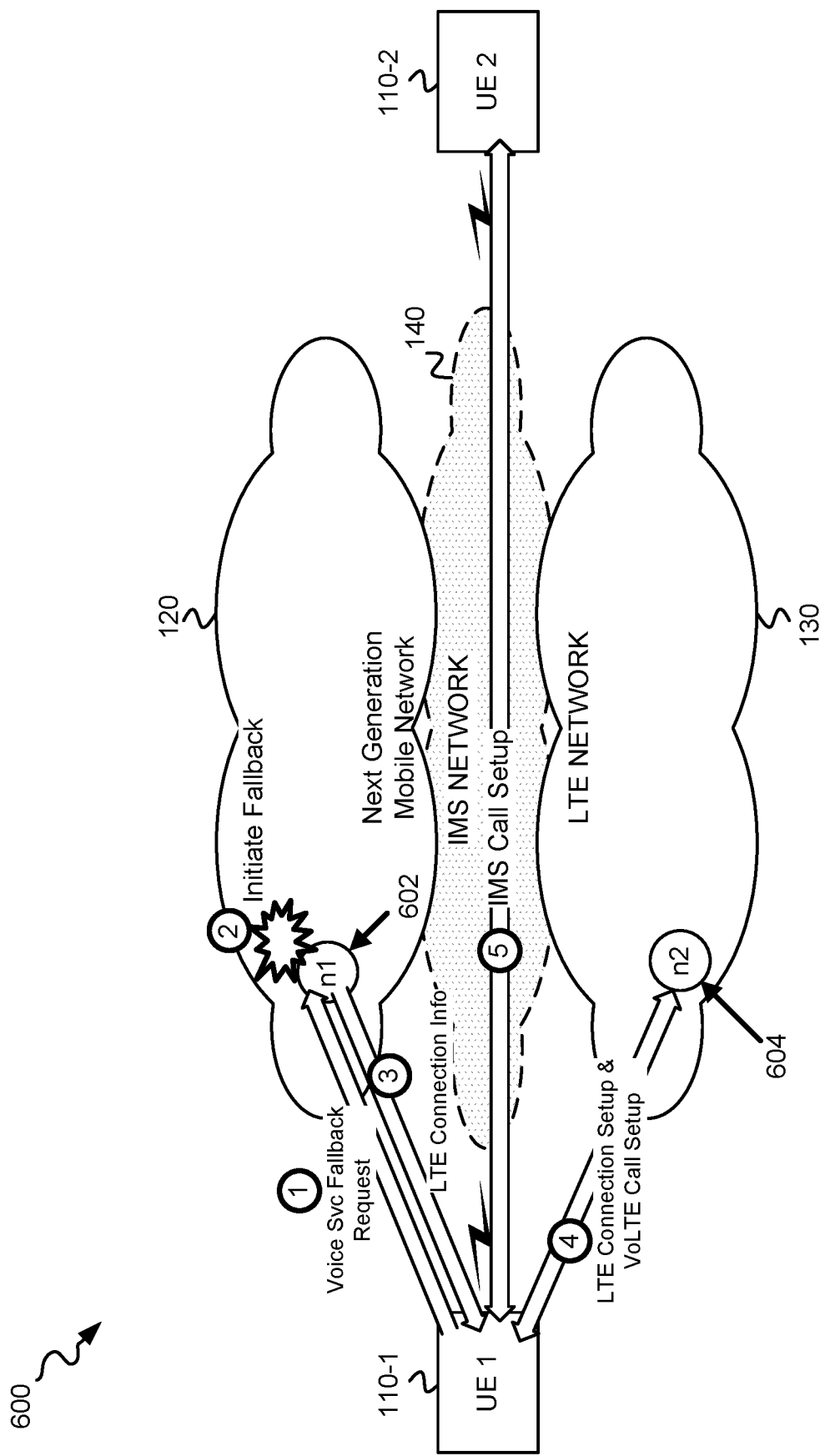
FIGS. 6A-6B depict exemplary network environment diagrams that illustrate elements of the exemplary method of FIG. 5 according to principles described herein.
Figure 6B:
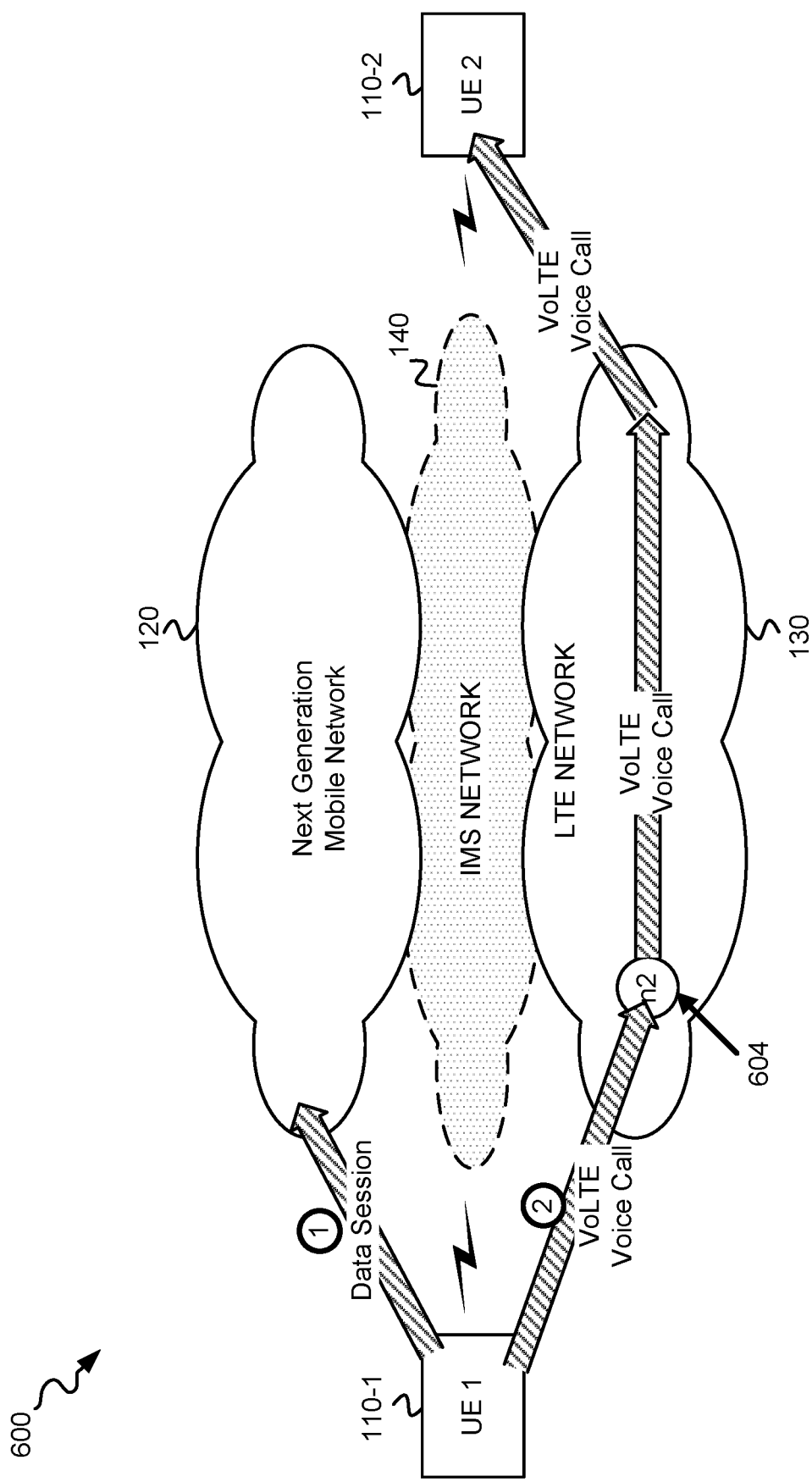

FIGS. 6A-6B depict exemplary network environment diagrams that illustrate elements of method 500 in relation to a network environment 600. Network environment 600 includes the same elements as network environment 100 of FIG. 1. An exemplary node (n1) 602 of Next Generation mobile network 120 and an exemplary node (n2) 604 of LTE network 130 are shown for illustrative purposes. Node 602 may represent any suitable network device(s) in Next Generation mobile network 120, and node 604 may represent any suitable network device(s) in LTE network 130.

FIG. 6A shows user equipment 110-1 sending and Next Generation node 602 receiving a service request message for voice service fallback to VoLTE (identified with a sequence number "1" within a circle). The service request message may be sent and received by way of a connection (e.g., an RRC connection) between user equipment 110-1 and node 602. The service request for voice service fallback to VoLTE may be sent and received without call setup for the voice call ever being performed via Next Generation mobile network 120.

FIG. 6A further shows node 602 initiating fallback to LTE network 130 in response to the service request message (identified with a sequence number "2" within a circle) and sending LTE connection information to user equipment 110-1 by way of the connection between user equipment 110-1 and node 602 (identified with a sequence number "3" within a circle).

Node 602 and user equipment 110-1 may release the Next Generation connection between them. In an alternative implementation, the release of the Next Generation connection may be omitted, and user equipment 110-1 may continue with one or more data sessions via Next Generation mobile network 120 and also engage in VoLTE voice calls via LTE network 130.

User equipment 110-1, using the received LTE connection information (e.g., redirection information), engages in LTE connection setup and VoLTE call setup (identified with a sequence number "4" within a circle) with node 604 in LTE network 130. User equipment 110-1 engages in VoLTE IMS call setup (e.g., via a previously established IMS PDN connection that may be established during VoLTE connection setup or VoLTE call setup) with a call destination device. FIG. 6A depicts user equipment 110-1 engaging in IMS call setup (identified with a sequence number "5" within a circle) with IMS network 140. Existing SIP signaling processes may be used for the VoLTE IMS call setup between user equipment 110-1 and the call destination device (e.g., between user equipment 110-1 and user equipment 110-2). The VoLTE IMS call setup signaling enables a voice call to be placed between user equipment 110-1 and the call destination device. User equipment 110-1 may engage in IMS call setup with user equipment 110-2 via, for example, P-CSCF 260-P1, S-CSCF 260-S1, I-CSCF 260-I, S-CSCF 260-S2, and/or P-CSCF 260-P2 of IMS network 140 of FIG. 2B.

User equipment 110-1 sends a VoLTE voice call via LTE network 130 to the call destination device. As shown in FIG. 6B, user equipment 110-1 may have previously been engaged in a data session (identified with a sequence number "1" within a circle) via Next Generation mobile network 120 and, subsequent to the LTE connection setup and VoLTE call setup, user equipment 110-1 may originate a VoLTE voice call (identified with a sequence number "2" within a circle) via LTE network 130.

In the alternative implementation in which the Next Generation connection is not released, user equipment 110-1 may continue to engage in one or more data sessions (identified with a "1" within a circle in FIG. 6B) while simultaneously originating a VoLTE voice call via LTE network 130. Additionally, while not shown in FIG. 6B, if LTE network 130 supports data delivery, then user equipment 110-1 may engage in a data session via LTE network 130 while the VoLTE voice call is in progress. Subsequent to call setup, a bidirectional flow of voice packets (only one direction of flow is show in FIG. 6B) for the voice call and control signaling may occur between UE 110-1 and the call destination device UE 110-2.

Method 500 may be performed to fallback to LTE for voice calls in situations in which Next Generation mobile network 120 is able to suitably initiate the fallback to LTE network 130 in response to receiving a service request for voice service fallback to LTE from user equipment 110. For example, method 500 may represent a process that is performed to fall back to LTE for a voice call when Next Generation mobile network 120 is able to timely respond to a request from user equipment 110, such as by timely initiating fallback to LTE in response to a service request from user equipment 110.

In addition or alternative to performing fallback to LTE in this manner, user equipment 110 may be configured to autonomously fall back from Next Generation mobile network 120 to an LTE network without relying on Next Generation mobile network 120 to initiate fallback operations in response to a service request for voice service fallback to LTE. Such autonomous fallback to LTE for voice calls may provide benefit in certain situations, such as for certain types of voice calls (e.g., emergency calls such as e911 calls) and/or when Next Generation mobile network 120 is congested, unresponsive, or delayed. Examples of such autonomous fallback methods will now be described.

Figure 7:
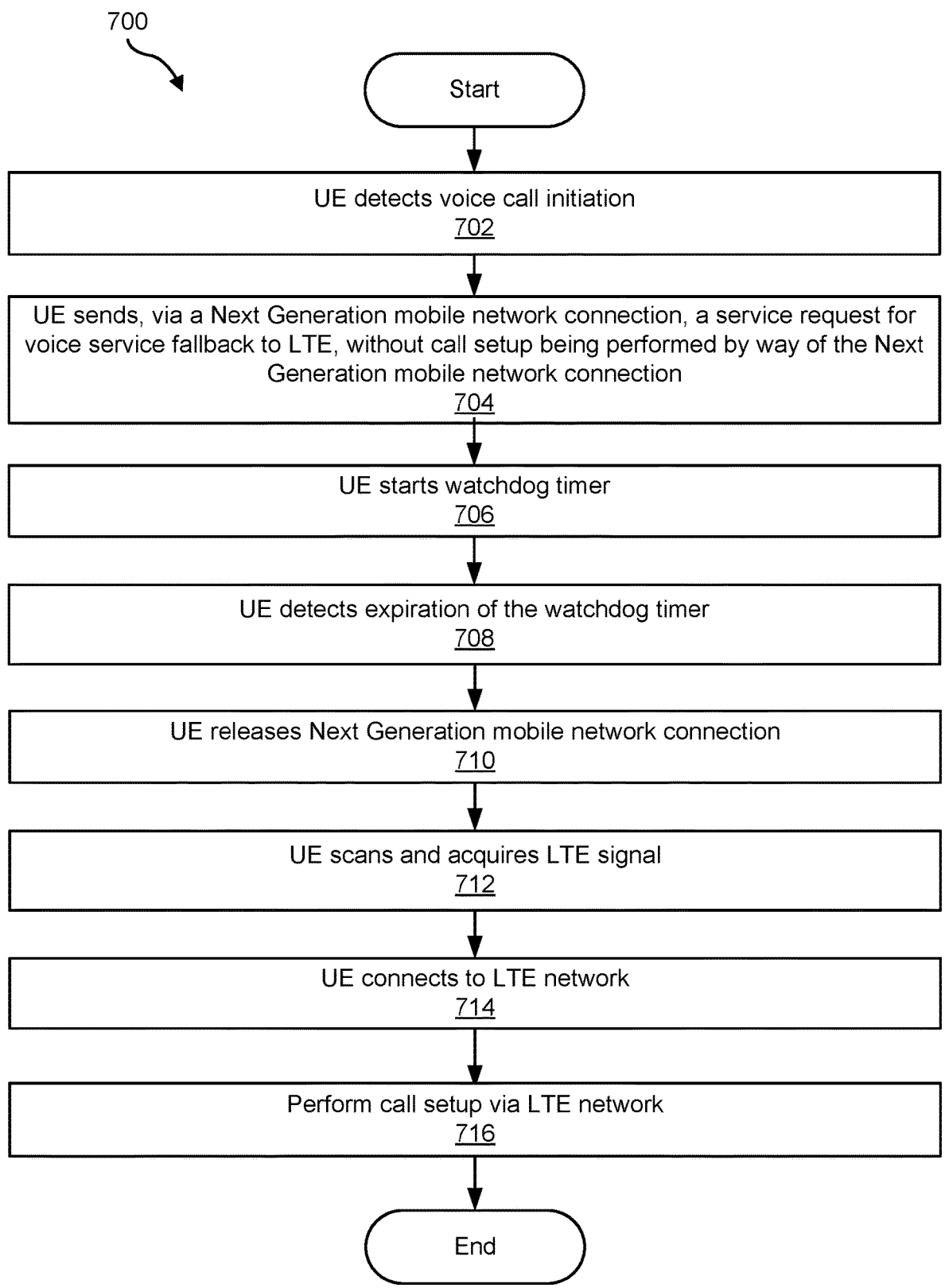
FIG. 7 depicts an exemplary method of autonomously falling back to an LTE network for a voice call according to principles described herein.

FIG. 7 depicts an exemplary method 700 of autonomously falling back to an LTE network for a voice call. While FIG. 7 illustrates exemplary operations according to certain embodiments, other embodiments may omit, add to, reorder, and/or modify any of the operations shown in FIG. 7. One or more of the operations shown in FIG. 7 may be implemented and/or performed by network devices such as user equipment 110 in conjunction with one or more nodes in Next Generation mobile network 120, LTE network 130, and/or IMS network 140.

Method 700 includes user equipment (UE) 110 detecting initiation of a voice call (block 702). User equipment 110 may detect the initiation of the voice call in any suitable way, including by detecting an initiation of an outgoing voice call by a user of user equipment 110 or by receiving an invitation to join an incoming voice call.

Method 700 further includes user equipment 110 sending, via a Next Generation mobile network connection to Next Generation mobile network 120, a service request for voice service fallback to LTE (block 704). The Next Generation mobile network connection may include any suitable communicative connection between user equipment 110 and a node of Next Generation mobile network 120. User equipment 110 sends the service request without call setup for the voice call being performed by way of the Next Generation mobile network connection.

If user equipment 110 is idle when initiation of the voice call is detected (e.g., no RRC connection is established with Next Generation mobile network 120), user equipment 110 may set up, as part of block 704, the Next Generation mobile network connection in response to the detection and before sending the service request via the connection.

Method 700 further includes user equipment 110 starting a watchdog timer (block 706). User equipment 110 may start the watchdog timer in response to, in conjunction with, or based on any predetermined operation of user equipment 110. As an example, user equipment 110 may start the watchdog timer based on when user equipment 110 sends the service request for voice service fallback to an LTE network (e.g., in conjunction with sending the service request to a node of Next Generation mobile network). As another example, user equipment 110 may start the watchdog timer based on when user equipment 110 in an idle state sends a request to set up a connection with Next Generation mobile network 120.

The watchdog timer may be set for any suitable length of time and may be configured to expire if a particular response is not received from Next Generation mobile network 120 within a set time limit. The time limit may be set to any value, such as a value designed to provide a certain Quality of Service (QoS) level. As an example, the watchdog timer may be configured to expire if a response to a service request for voice service fallback to LTE is not received by user equipment 110 within the set time limit. As another example, the watchdog timer may be configured to expire if a response to a request to set up a connection with Next Generation mobile network 120 is not received by user equipment 110 within the set time limit.

In the example illustrated in FIG. 7, a response is not received within the length of time of the watchdog timer, and method 700 further includes user equipment 110 detecting an expiration of the watchdog timer (block 708). User equipment 110 may detect the expiration of the watchdog timer in any suitable way.

In response to the detected expiration of the watchdog timer, user equipment 110 initiates autonomous fallback from Next Generation mobile network 120 to LTE network 130. The autonomous fallback includes user equipment 110 releasing the Next Generation mobile network connection (block 710), scanning and acquiring an LTE signal (block 712), connecting to LTE network 130 (block 714), and performing call setup via the LTE connection with the LTE network 130 (block 716). User equipment 110 may perform these fallback operations autonomously without notifying Next Generation mobile network 120 of the fallback and/or without relying on Next Generation mobile network 120 to initiate the fallback operations in response to the service request.

User equipment 110 may be configured to scan for and acquire an LTE signal in any suitable way. For example, user equipment 110 may be configured to scan for and acquire an LTE signal based on a frequency band scan priority. The frequency band scan priority may be predetermined or determine on the fly based on information stored at user equipment 110, LTE neighbor information, and/or information accessed by user equipment 110 from other sources. The scan priority may be defined to speed up scanning to find an LTE frequency band that can be used by user equipment 110 to connect to an LTE network.

In certain examples, the scan priority may specify an algorithm to find LTE as fast as possible. For example, the algorithm may specify to first scan for a ubiquitous band and/or channel (e.g., band 13, which may be one 10 MHz channel) that has high probability of being found. The algorithm may further specify an order in which other frequency bands and channels will be scanned by user equipment 110 to find an LTE signal. To illustrate, an exemplary algorithm may specify the following order for scanning: band 13, LTE band last used by user equipment 110, band 4/66, band 2, band 5. After these bands are scanned and no LTE signal is found or acquired, the algorithm may refine the scan order based on a neighbor list associated with Next Generation mobile network 120 (e.g., a 5G NR SIB5 LTE neighbor list).

After user equipment 110 finds and acquires an LTE signal, user equipment 110 uses the LTE signal to connect to LTE network 130 (block 714) and perform call setup via the LTE connection with the LTE network (block 716). User equipment 110 may engage in LTE connection and call setup operations in any of the ways described herein, including as described in reference to blocks 512 and 514 of FIG. 5, to complete fallback from Next Generation mobile network 120 to LTE network 130 for the voice call.

Figure 8:
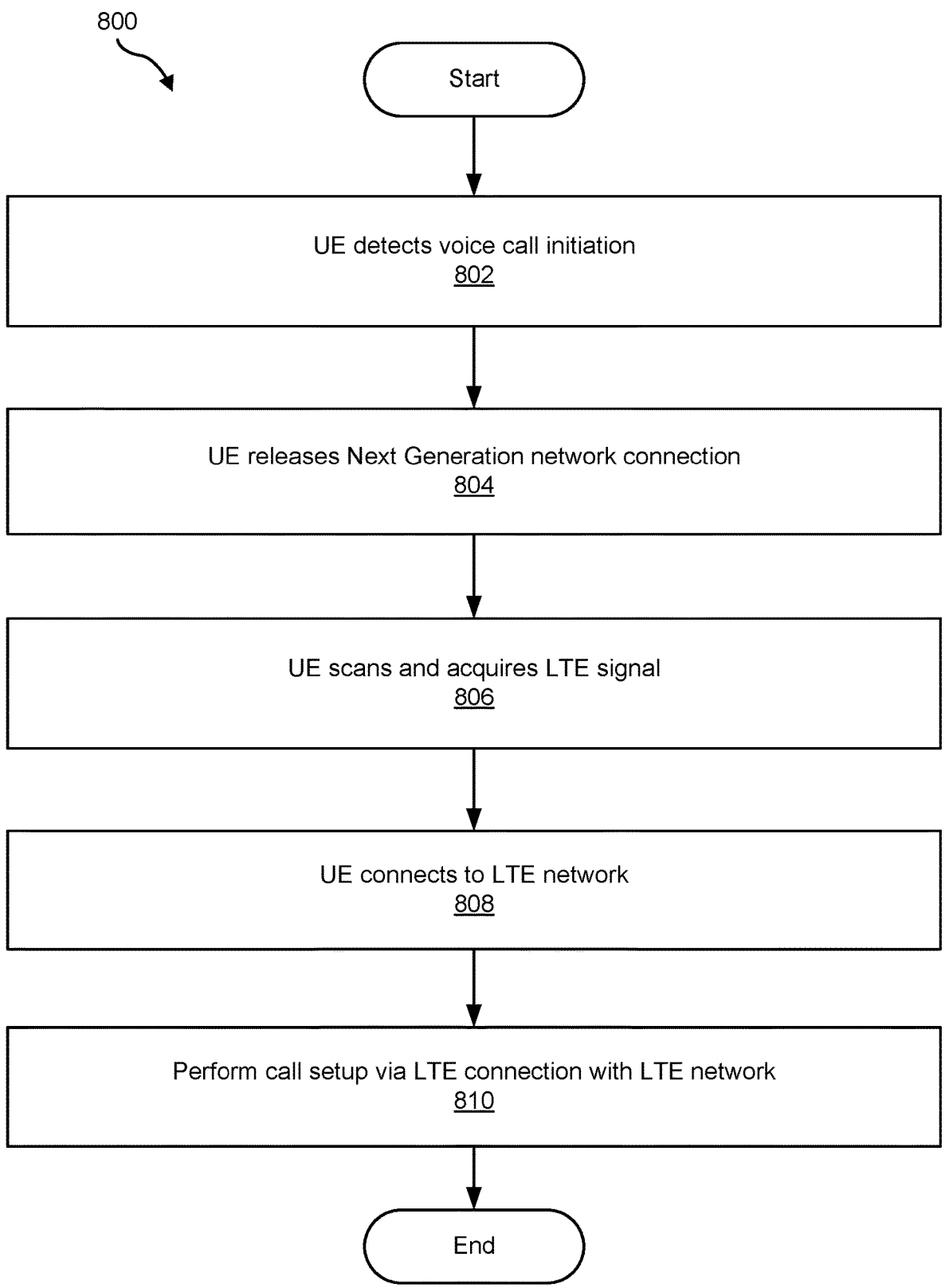
FIG. 8 depicts an exemplary method of autonomously falling back to an LTE network for a voice call according to principles described herein.

FIG. 8 depicts an exemplary method of autonomously falling back to an LTE network for a voice call. While FIG. 8 illustrates exemplary operations according to certain embodiments, other embodiments may omit, add to, reorder, and/or modify any of the operations shown in FIG. 8. One or more of the operations shown in FIG. 8 may be implemented and/or performed by network devices such as user equipment 110 in conjunction with one or more nodes in Next Generation mobile network 120, LTE network 130, and/or IMS network 140.

Method 800 includes user equipment (UE) 110 detecting initiation of a voice call (block 802). User equipment 110 may detect the initiation of the voice call in any suitable way, including by detecting an initiation of an outgoing voice call by a user of user equipment 110 or by receiving an invitation to join an incoming voice call.

In response to the detected initiation of the voice call, user equipment 110 initiates autonomous fallback from Next Generation mobile network 120 to LTE network 130. The autonomous fallback includes user equipment 110 releasing a Next Generation mobile network connection with Next Generation mobile network (block 804), scanning and acquiring an LTE signal (block 806), connecting to LTE network 130 (block 808), and performing call setup via the LTE connection with the LTE network 130 (block 810). User equipment 110 may perform these fallback operations autonomously without notifying Next Generation mobile network 120 of the fallback and/or without relying on Next Generation mobile network 120 to initiate the fallback operations in response to the service request. The operations of blocks 804, 806, 808, and 810 of FIG. 8 may be performed the same as or similar to the operations of blocks 710, 712, 714, and 716 of FIG. 7.

In certain examples, user equipment 110 may be configured to perform the autonomous fallback of method 800 in response to detecting an initiation of a voice call having a specific attribute or set of attributes, such as a voice call of a specific type. For example, the voice call may be an emergency call such as an e911 call. User equipment 100 may be configured to detect the initiation of the emergency voice call and, based on the voice call being an emergency voice call, may initiate autonomous fallback to LTE for the voice call as illustrated in FIG. 8.

In certain examples, two or more of methods 500, 700, and 800 may be implemented in conjunction with one another in a network environment. As an example, method 800 may be performed for emergency type voice calls, while method 500 and/or method 700 may be performed for non-emergency, normal, or other types of voice calls. As another example, method 500 may be performed for voice calls when Next Generation mobile network 120 timely responds to a service request for voice service fallback to LTE, and method 700 may be performed for voice calls when Next Generation mobile network 120 is congested, unresponsive, delayed in responding, or experiencing another issue that may delay, prevent, or otherwise affect fallback to LTE.

In certain embodiments, one or more of the systems, components, and/or processes described herein may be implemented and/or performed by one or more appropriately configured computing devices, such as network device 300. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor, a CPU, a GPU, etc.) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting a request to set up a voice call originating from or terminating at a user equipment that is connected or configured to connect to a Fifth Generation (5G) mobile network;
   transitioning, in response to the request to set up the voice call, the user equipment from having a 5G mobile network connection with the 5G mobile network to having a Long Term Evolution (LTE) network connection with an LTE network, the detecting and the transitioning performed without call setup being initiated for the voice call via the 5G mobile network, wherein based on the voice call being a non-emergency type voice call, the transitioning comprises the user equipment
      sending, via the 5G mobile network connection, a service request for voice service fallback to the LTE network,
      starting a watchdog timer, wherein when the user equipment is connected to the 5G mobile network when the request to set up the voice call is detected, the watchdog timer is started based on when the user equipment sends the service request for voice service fallback to the LTE network, and when the user equipment is not connected to the 5G mobile network when the request to set up the voice call is detected, the watchdog timer is started based on when the user equipment sends a request to set up a connection with the 5G mobile network in response to detecting the request to set up the voice call,
      detecting an expiration of the watchdog timer,
      scanning, in response to the expiration of the watchdog timer, LTE frequency bands in a scan order specified by a frequency band scan priority,
      in response to the LTE bands being scanned and no LTE network signal being acquired, refining the scan order based on an LTE neighbor list,
      scanning and acquiring an LTE network signal based on the refined scan order, and
      establishing the LTE network connection with the LTE network based on the acquired LTE network signal;
   performing call setup for the voice call via the LTE network connection with the LTE network;
   detecting, when the user equipment is connected to the 5G mobile network, an initiation of an emergency type voice call at the user equipment; and
   autonomously falling back, by the user equipment in response to the detecting the initiation of the emergency type voice call at the user equipment, to the LTE network for the emergency type voice call without initiating the emergency type voice call via the 5G mobile network.

2. The method of claim 1, wherein:
   detecting the request to set up the voice call comprises the user equipment detecting an initiation of the voice call.

3. The method of claim 1, wherein the transitioning further comprises
   releasing the 5G mobile network connection.

4. The method of claim 3, wherein the frequency band scan priority specifies a first scan for a first LTE band followed by a second scan for a second LTE band, the second LTE band being an LTE band last used by the user equipment.

5. The method of claim 3, wherein the LTE neighbor information comprises an LTE neighbor list associated with the 5G mobile network.

6. The method of claim 5, wherein the LTE neighbor list associated with the 5G mobile network comprises a 5G NR SIB5 LTE neighbor list.

7. The method of claim 1, embodied as computer-executable instructions on at least one non-transitory computer-readable medium.

8. The method of claim 1, wherein the performing call setup for the voice call via the LTE network connection with the LTE network comprises the user equipment re-registering with an Internet Protocol Multimedia System (IMS) network and requesting a packet data network (PDN) connection.

9. The method of claim 1, wherein the transitioning comprises:
   maintaining the 5G mobile network connection with the 5G mobile network to continue a data session over the 5G mobile network connection; and
   establishing the LTE network connection with the LTE network to engage in the voice call via the LTE network.

10. A method comprising:
    detecting, at a user equipment that is connected or configured to connect to a Fifth Generation (5G) mobile network, an initiation of a voice call;
    sending, by the user equipment to a node in the 5G mobile network and in response to the detecting the initiation of the voice call and based on the voice call being a non-emergency type voice call, a service request for voice service fallback to a Long Term Evolution (LTE) network;

starting, by the user equipment, a watchdog timer, wherein when the user equipment is connected to the 5G mobile network when the initiation of the voice call is detected, the watchdog timer is started based on when the user equipment sends the service request for voice service fallback to the LTE network, and when the user equipment is not connected to the 5G mobile network when the initiation of the voice call is detected, the watchdog timer is started based on when the user equipment sends a request to set up a connection with the 5G mobile network in response to detecting the initiation of the voice call;

detecting, by the user equipment, an expiration of the watchdog;

scanning, in response to the expiration of the watchdog timer, LTE frequency bands in a scan order specified by a frequency band scan priority;

in response to the LTE bands being scanned and no LTE network signal being acquired, refining the scan order based on an LTE neighbor list;

scanning and acquiring an LTE network signal based on the refined scan order;

using the LTE network signal to engage in connection setup and call setup with the LTE network;

detecting, when the user equipment is connected to the 5G mobile network, an initiation of an emergency type voice call at the user equipment; and autonomously falling back, by the user equipment in response to the detecting the initiation of the emergency type voice call at the user equipment, to the LTE network for the emergency type voice call without initiating the emergency type voice call via the 5G mobile network.

11. The method of claim 10, wherein the detecting the initiation of the voice call comprises
detecting a receipt of an invitation to join an incoming voice call terminating at the user equipment.

12. The method of claim 10, embodied as computer-executable instructions on at least one non-transitory computer-readable medium.

13. The method of claim 10, wherein the frequency band scan priority specifies a first scan for a first LTE band followed by a second scan for a second LTE band, the second LTE band being an LTE band last used by the user equipment.

14. The method of claim 10, further comprising:
continuing a data session over the 5G mobile network while engaging in the voice call via the LTE network.

15. The method of claim 10, wherein the LTE neighbor list associated with the 5G mobile network comprises a 5G NR SIB5 LTE neighbor list.

16. The method of claim 10, wherein the autonomously falling back, by the user equipment in response to the detecting the initiation of the emergency type voice call at the user equipment, to the LTE network for the emergency type voice call is performed without notifying the 5G mobile network of the falling back to the LTE network for the emergency type voice call.

17. A network device comprising:
a processor; and
a non-transitory computer-readable medium communicatively coupled to the processor and storing instructions executable by the processor to:
detect an initiation of a voice call,
send, to a node in a Fifth Generation (5G) mobile network and in response to the detecting the initiation of the voice call and based on the voice call being a non-emergency type voice call, a service request for voice service fallback to a Long Term Evolution (LTE) network,
start a watchdog timer, wherein when the network device is connected to the 5G mobile network when the initiation of the voice call is detected, the watchdog timer is started based on when the processor sends the service request for voice service fallback to the LTE network, and when the network device is not connected to the 5G mobile network when the initiation of the voice call is detected, the watchdog timer is started based on when the processor sends a request to set up a connection with the 5G mobile network in response to detecting the initiation of the voice call,
detect an expiration of the watchdog timer,
scan, in response to the expiration of the watchdog timer, LTE frequency bands in a scan order specified by a frequency band scan priority,
in response to the LTE bands being scanned and no LTE network signal being acquired, refining the scan order based on an LTE neighbor list,
scanning and acquiring an LTE network signal based on the refined scan order,
using the LTE network signal to engage in connection setup and call setup with the LTE network;
detect an initiation of an emergency type voice call; and
autonomously fall back, in response to the detecting the initiation of the emergency type voice call, to the LTE network for the emergency type voice call without initiating the emergency type voice call via the 5G mobile network.

18. The network device of claim 17, wherein the detecting the initiation of the voice call comprises
detecting a receipt of an invitation to join an incoming voice call terminating at the network device.

19. The network device of claim 17, wherein the frequency band scan priority specifies a first scan for a first LTE band followed by a second scan for a second LTE band, the second LTE band being an LTE band last used by the user equipment.

20. The network device of claim 17, wherein:
the autonomously falling back, in response to the detecting the initiation of the emergency type voice call at the user equipment, to the LTE network for the emergency type voice call is performed without relying on the 5G mobile network to initiate the fall back to the LTE network for the emergency type voice call.

* * * * *